S. Shattuc,
Milk Cooler.
No. 107,107. Patented Sep. 6, 1870.

Inventor.
Samuel Shattuc

Witnesses.

United States Patent Office.

SAMUEL SHATTUC, OF KIPTON, OHIO.

Letters Patent No. 107,107, dated September 6, 1870.

IMPROVEMENT IN MILK-CAN AND COOLER.

The Schedule referred to in these Letters Patent and making part of the same.

*To all whom it may concern:*

Be it known that I, SAMUEL SHATTUC, of Kipton, in the county of Lorain and State of Ohio, have invented a certain new and improved Can and Cooler for Transportation of Milk; and I do hereby declare that the following is a full, clear, and complete description of the same, reference being had to the accompanying drawing making part of this specification.

Description.

Figure 1:
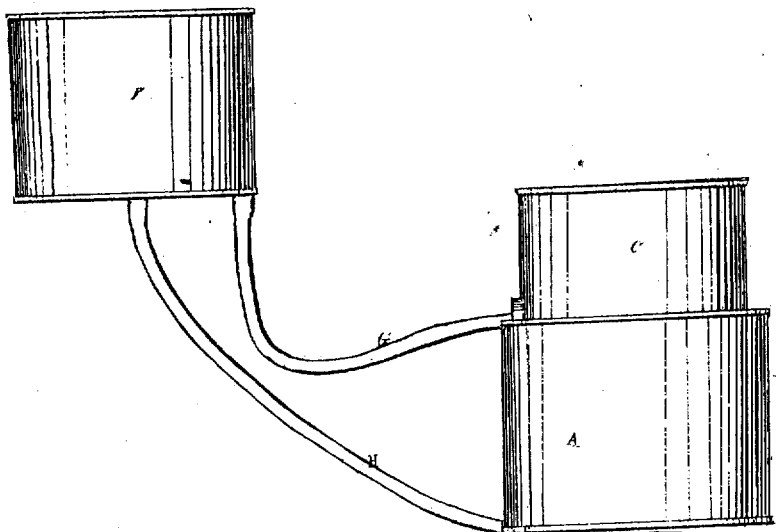
Figure 2:
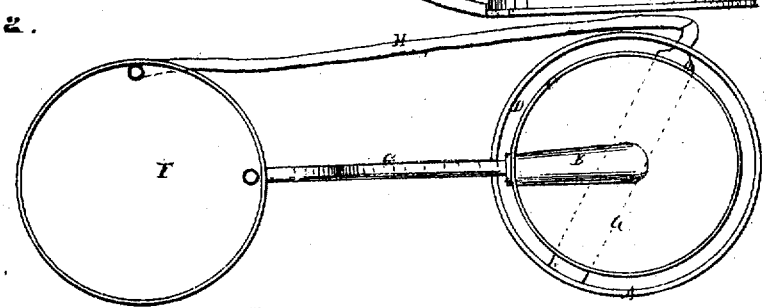
Figure 3:
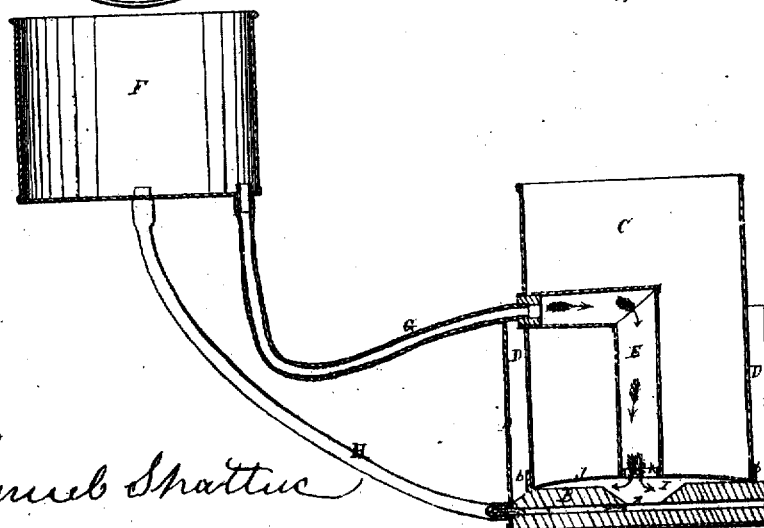

Figure 1 is a side elevation of the apparatus.
Figure 2, a plan view of the same.
Figure 3, a vertical transverse section.
Like letters of reference refer to like parts in the several views.

This invention has for its object the transportation of milk from the dairy to the cheese-factory, or other place or places, and keeping the same at a cool temperature during its transit, so that the animal heat and odor shall be freed therefrom.

It also relates to the construction of the milk-can, so that the bottom thereof shall have its bearing on its marginal surface, thereby relieving the central section thereof from undue strain, and thus providing for its greater strength and security in holding the milk, as hereinafter more fully set forth.

In the drawing, fig. 1—

A represents a cylindrical vessel, the capacity of which being more or less, as may be required.

On the bottom of said vessel, and transversely therewith, is fitted a pipe, B, fig. 3, also indicated by the dotted lines *a*, fig. 2, the purpose of which will presently be shown.

C, fig. 1, is the milk-can, which is also cylindrical in shape, but taller and of less diameter than the vessel A in which it is placed, so that, between the can and the wall of the vessel A, there is a wide space or annular chamber D.

In said can is a right-angled pipe, E, the vertical leg of which penetrates the bottom of the can, and communicates with the vessel A, whereas the horizontal leg thereof penetrates the side of the can near the brim, and is put in direct communication with reservoir or water-tank, F, by means of a flexible tube, G.

The vessel A is also connected with the tank by a flexible tube, H, both of which enter the bottom of the tank, and may each be provided with a faucet, for regulating the flow of water therefrom to the vessel referred to.

It is well known to those having the care and transportation of milk that it suffers serious injury if, while being carried, it is long exposed to the heat of the summer days.

The animal heat and odor always present in new milk must first be removed before it can be made into good cheese or butter, and for that purpose the sooner it is removed the better will be the quality of the cheese and butter.

To accomplish this, and, furthermore, to prevent it from soon becoming sour, is the object of my invention, and the practical operation of the same is as follows:

The vessel A is placed upon the floor of the milk-wagon or other place, and secured thereto by any suitable means. The water-tank F is also placed in the wagon, car, or other place, and in such relation to the vessel that it shall be elevated above it, as shown in fig. 1. In the tank is placed cold water, which is kept at a low temperature by the presence of ice. The milk for transportation is filled into the can C. This being done, it is then surrounded with ice-water from the tank, by discharging therefrom, through the tube G, flowing through the pipe E, as indicated by the arrows, thereby surrounding the milk-can with ice by filling the spaces D.

It will be obvious that by this means the entire milk-can and its contents are not only surrounded by the ice and water, and thereby rapidly reduced and retained at a low temperature, but the more central portion of the mass of milk is also exposed to the influence of the ice-water, filling the pipe so that the entire mass of milk is rapidly reduced to the temperature of the ice, thereby not only dissipating the animal heat and odor therefrom, but also protecting it from the influence of the summer heat, so that the milk can be transported safely, and without injury, to its destination.

A constant current of water can be caused to flow from the reservoir into the vessel, by allowing the surplus water to flow over the edge thereof, or from any point in the side of the vessel.

By this means the water, as fast as it may become warmed by the heat of the milk, is replaced by a cooler supply.

This is especially desirable when the milk is to be conveyed to a considerable distance, and the weather unusually warm.

It will be observed that the induction of the cold water is at all times at the center of the vessel, and from which point it is diffused to the surrounding mass of milk, thereby first cooling the milk where the larger amount of heat is present.

Instead of the milk-can C, above described, being used in combination with the vessel A, an ordinary milk-can may be used therewith, by placing it within the vessel, its bottom resting upon the pipe B, and other supports by the sides thereof. In the event that such a can is used, it is surrounded with ice-water from the tank, through the tube H, the water entering the vessel through the pipe B, as indicated by the arrows, a wide notch, I, being cut in the upper side of the pipe from which flows the water into the vessel. By this means the expense of a new milk-can is avoided, and the milk carried without injury or waste.

It will be observed that the bottom J, fig. 3, of the milk-can, is convex on its upper side, and concave on its under side.

By this means the periphery of the bottom is made to support the weight of the can and its contents, thereby relieving the central section from contact with the floor or bottom of the vessel or supports; hence no great train is exerted upon the connection of the pipe with the bottom of the can; therefore it will not become leaky, in consequence of any jarring to which the apparatus may be subjected, which, if the bottom was flat and rested upon some support, would cause a leakage of the pipe at its junction with the bottom.

In order to support the sides of the can in its connection with the bottom, a deep flange, b, fig. 3, is turned up, embracing the outside thereof, and which is soldered thereto, giving, by this means, additional strength to the can, making the same strong, durable, and tight.

It will be observed that the pipe E is connected to the bottom of the can by an annular flange, K, whereby the connection of the two parts is greatly strengthened, and made more securely tight.

Claims.

What I claim as my invention, and desire to secure by Letters Patent, is—

1. The milk-can C, when constructed with a pipe, E, concave bottom J, substantially as described and for the purpose specified.

2. The milk-can C, as arranged in relation to, and in combination with the vessel A, water-tank F, and connecting pipe, in the manner substantially as described, and for the purpose set forth.

3. The concave bottom J, constructed with the central opening and flange, as and for the purpose set forth.

SAMUEL SHATTUC.

Witnesses:
W. H. BURRIDGE,
J. H. BURRIDGE.